3,151,025
BLOOD LIPID CLEARING COMPOSITION
Christopher H. Costello, Columbus, Ohio, assignor, by mesne assignments, to Philips Roxane, Inc., a corporation of Delaware
No Drawing. Filed Oct. 1, 1953, Ser. No. 383,695
2 Claims. (Cl. 167—65)

My invention relates to an agent for the therapeutic treatment and prophylaxis of atherosclerosis, angina pectoris, and other disorders involving impairment in fat metabolism in humans. More particularly, it relates to therapeutically useful compositions for parenteral administration comprising an anticoagulant drug combined with lipotropic agents and/or agents which aid in the transfer and synthesis of methyl groups in the body.

Atherosclerosis, a condition characterized by the deposition of fatty material in the intima of blood vessels, is perhaps the most common and most important disease affecting the arteries of man. Chemical analysis of these lesions have revealed that they consist mainly of cholesterol. It was formerly held that abnormally high cholesterol levels in the blood stream was the direct causative factor in the etiology of this disease, but recent research has shown that the manner in which cholesterol is bound in the body with fats and proteins has greater significance than high cholesterol levels per se. Strong quantitative relationships have been shown between the accelerated progression of coronary artery disease and the accumulation in the blood of certain lipid macromolecules, termed chylomicrons or abnormal elevation of giant cholesterol bearing lipoprotein molecules. It is felt by the majority of investigators of this disease that the occurrence of atherosclerosis is due to the cumulative effect of many fatty meals over a lifetime, which by producing transient showers of large lipid particles gradually cause their deposition in the lining of the arteries of susceptible persons, producing atherosclerotic lesions resulting in myocardial infarcts and angina pectoris. It is believed that susceptible people have an inherent lack of a "clearing factor" which breaks down the larger fat particles into a size which can be absorbed, causing them to disappear rapidly from the blood and preventing their deposition in the arteries.

The action of heparin administered parenterally in rapidly clearing the blood of chylomicrons and giant lipoprotein molecules has been repeatedly demonstrated and is generally accepted by the medical profession. Heparin is the only known pharmacological agent capable of accomplishing this rapid clearing action. Heparin will also reduce cholesterol levels in patients having diseases associated with hypercholesteremia and reduces the surface action of blood plasma in vivo.

The mechanism of action of heparin in accomplishing this clearing action is believed to be due to the formation in the body of a surface-active heparin-phospholipid physio-chemical complex which changes the physical state of the fat particles in the blood (Block, W. J.; Barker, N. W. and Mann, F. D.; Circulation 4:674–77, 1951), (Anderson, N. G. and Fawcett, B.; Proc. Soc. Exper. Biol. and Med. 74:768, 1952), (Swank, R. L. and Wilmot, V.; Am. J. Physiol. 167:403–412, 167, 1951).

This clearing action of heparin is independent of its anticoagulant or vasodilator action since it occurs even in dosage insufficient to cause either of the latter actions. This clearing effect or surface activity is not obtained when heparin is added to fatty blood in vitro, but only when heparin is injected into the body, nor is heparin effective by the oral route. Heparin itself demonstrates no surface activity. Several factors indicate that lecithin is the phospholipid with which heparin combines in the body to form the surface-active complex responsible for the clearing action. Lecithin is found in the body in combination with polysaccharides, a class of compounds to which heparin belongs. Pure lecithin in itself has no surface activity, but commercial grade lecithin has surface activity which is ascribed to the presence of polysaccharide impurities. Heparin was originally discovered by MacLean while attempting to fractionate a phospholipid preparation of animal origin. Furthermore, when heparin is reacted with egg lecithin, a complex is formed which gives a low surface tension in water and forms a soapy solution.

The therapeutic use of heparin is limited by several factors. These are extreme pain on intramuscular injection, the possible danger of hemorrhage due to prolongation of coagulation time, the necessity of keeping the patient non-ambulatory, and the need for constantly checking the coagulation or prothrombin times. Heparin is usually administered only to hospitalized patients, by intravenous drip under constant observation for this purpose. It is also administered in the form of depot intramuscular injections which consist of heparin dissolved in a viscous vehicle which retards the absorption of the drug. The use of the latter is usually accompanied by considerable pain. The dosage of heparin is highly critical and usually must be individualized.

Several authorities have demonstrated that the clearing action of heparin on blood lipid particles is independent of its anticoagulant action.

My invention relates to a therapeutic combination of heparin with certain other medicinal agents which potentiate the clearing action of the former against chylomicrons and giant lipoprotein molecules and markedly limit its anticoagulant action, significantly reduce pain on its injection, and permit its administration to ambulatory patients without the necessity of performing frequent coagulation and prothrombin time tests, and individualized dosage.

This can be accomplished by using with the heparin or a heparin derivative capable of clearing or reducing abnormal lipid particles in the blood, non-toxic phospholipids such as lecithin, cephalin or sphingomyelin, or phospholipid precursors, such as choline, methionine, inositol, betaine, lipocaic or their salts, the phospholipids or phospholipid precursors, or both, being used within the range of from equal amounts to about ten times the heparin derivative, calculated as choline equivalents. It is preferred to use a heparin derivative in the form of heparin sodium U.S.P. and a phospholipid precursor in the form of choline chloride which are combined in a vehicle suitable for injection. Other agents which enhance the synthesis and utilization of phospholipids by the body may be used in conjunction with the phospholipids or phospholipid precursors. Examples of such agents are folic acid, and vitamin $B_{12}$. The folic acid, when used, is preferably used in amounts within the range of about 0.1 milligram to 10 milligrams per cc. of solution and the vitamin $B_{12}$, when used, is preferably within the range of 1 microgram to 1000 micrograms per cc. of solution.

Choline salts, when injected parenterally, are converted rapidly and directly into liver lecithin, an efficient phospholipid, making the latter readily available for combination in the body with heparin to form the heparin-phospholipid complex believed to be responsible for lipemia clearing action.

The blood of patients suffering from impaired fat metabolism has been shown to be notably lacking in phospholipid content, and is significantly resistant to the fat clearing action of heparin as opposed to normal patients. Parenteral administration of choline salts causes a temporary but significant increase of blood and liver phospholipids and markedly improves the response to the clearing action of heparin when administered concurrently.

This effect is not obtained by oral administration of choline unless relatively large amounts are administered, and then the effect is not immediate. Choline when given orally is transformed in the intestine to trimethylamine to a considerable extent. It has been shown that only choline-containing phospholipids mobilize neutral fat, and that these phospholipids are dependent upon the availability of the entire choline molecule. Because of the transformation of orally administered choline by the intestine to trimethylamine, only a small portion is available as the entire choline molecule for immediate transformation into choline-containing phospholipid. On the other hand, parenterally administered choline is relatively rapidly available for this purpose.

In addition to its lipotropic action, parenterally administered choline exerts a very definite effect on vagus functions, being capable of lowering blood pressure and relieving anginal attack, symptoms associated with atherosclerosis and hypertension. This effect is attributed to its similarity to acetylcholine, a well known vasodilator which has about 1000 times the vasodilator potency of choline.

Choline salts are wetting agents to an unusual degree and hence exhibit excellent detergent action. Under certain conditions these salts possess strong penetrating powers and are capable of carrying other constituents along with them, thereby fortifying and assisting the pharmacological effects of other substances. Choline chloride, for example, when injected into pus cavities, causes the liquefaction and disappearance of the pus. Heparin, therefore, which is usually extremely painful on injection, when injected intramuscularly concurrently with choline salts, is rapidly absorbed from the tissue, resulting in little or no pain. In addition its pharmacological effect on blood lipid particles is markedly enhanced.

The detergent action of parenterally administered choline has been demonstrated by its reduction in the size and frequency of fat embolism in laboratory animals. It is believed that the concurrent administration of heparin and choline salts results in a rapid clearing of blood lipid particles and a removal of lipoprotein sludge from the intima of the arteries by their individual and complementary actions, thus improving the prognosis in atheroclerosis, angina pectoris, and diseases associated with impaired fat metabolism.

Both heparin and choline individually relieve anginal pain when administered parenterally. When the two are administered concurrently a mutual potentiation of effect results in greater symptomatic improvement and longer duration of action.

In choline deficiency and liver disease, there is usually an increase in prothrombin time which is overcome by the therapeutic administration of choline salts. This has been demonstrated in animals. The anticoagulant action of heparin is due mainly to its property of inactivating thrombin, the clotting principle of blood, which is formed in the body from prothrombin and thromboplastin. The chief source of prothrombin is the liver, and thromboplastin is known to be a phospholipid. Choline and its salts improve liver function and supply phospholipids rapidly. Hence supplementation of choline, particularly in deficient persons, increases the ability of the body to combat the anticoagulant action of heparin. One of the purposes of this invention is to limit the action of heparin to a clearance of blood lipid particles; thus nullification of this anticoagulant effect is clinically desirable. Clinical experience has shown that when a combination of heparin sodium and choline chloride are administered parenterally, the coagulation time is not altered significantly, and the clearing effect on lipid particles is markedly enhanced over either ingredient alone. The effect of choline in shortening prothrombin time has been demonstrated in vivo.

The phospholipid forming action of choline is markedly enhanced by certain agents which exert a spacing action on utilization of choline by the body, assuring its conversion into phospholipid. By supplying methyl groups to meet the prior demands of the body on choline for the formation of creatinine, and by stimulating the synthesis of choline by the body, these agents markedly enhance the lipotropic action of choline and hence further potentiate the action of the heparin-choline combination.

Animal experiments show that the choline requirements may be reduced by one-half when folic acid and vitamin $B_{12}$ are supplied simultaneously. Folic acid functions primarily in methyl synthesis and vitamin $B_{12}$ is involved in the transfer and utilization of labile methyl groups. Methionine is converted directly into creatinine, essential for muscle energy, thus sparing choline for incorporation into phospholipid. Methionine also exerts a lipotropic action of its own. Vetaine is also a methyl donor and an active lipotropic agent. The favorable effect of inositol on the lipotropic action of choline has been demonstrated by many workers as a synergistic action between these two agents. Methionine, betaine, and inositol are also potential choline precursors.

Niacinamide or nicotinic acid may also be employed in combination with heparin and choline. Niacinamide and nicotinic acid has been shown to present the deposition of fat in the liver. Nicotinic acid has a vasodilator action. Both of these properties may enhance the effect of heparin and choline.

The invention may be illustrated by, but not restricted to, the following examples.

EXAMPLE I

| | Parts |
|---|---|
| Heparin sodium, U.S.P., 92,500 units | 2.5 |
| Choline chloride | 10 |
| Vitamin $B_{12}$, U.S.P. | 0.0015 |
| Folic acid, U.S.P. | 0.2 |
| Niacinamide | 5.0 |
| Benzyl alcohol (bacteriostatic agent) | 1.5 |
| Water for injection, U.S.P., q.s. | 100 |

An aqueous solution of the above is prepared by the usual art under aseptic conditions and filtered through a bacterial type candle filter. It is then filled into glass ampuls or vials, also under sterile conditions and the ampuls sealed by fusion and the vials with rubber stoppers around which are crimped aluminum seals. The filled containers are then sterilized by heating to 70° C. for one hour on three consecutive days or by autoclaving for 30 minutes at 110°.

EXAMPLE II

| | Parts |
|---|---|
| Heparin sodium, U.S.P. (2500 units) | 2.5 |
| Choline chloride | 10 |
| dl Methionine | 2.5 |
| Inositol | 1.5 |
| Benzyl alcohol (bacteriostatic agent) | 1.5 |
| Water for injection, U.S.P., q.s. | 100 |

EXAMPLE III

| | Parts |
|---|---|
| Heparin sodium, U.S.P. (2500 units) | 2.5 |
| Choline chloride | 10 |
| Vitamin $B_{12}$, U.S.P. | 0.0015 |
| Folic acid, U.S.P. | 0.2 |
| Methionine | 2.0 |
| Inositol | 1.5 |
| Betaine | 0.5 |
| Benzyl alcohol | 1.5 |
| Water for injection, U.S.P., q.s. | 100 |

The above is prepared as described in Example I.

EXAMPLE IV

| | Parts |
|---|---|
| Heparin sodium, U.S.P. | 1.25 |
| Cephalin | 9.4 |
| Water for injection, U.S.P., q.s. | 100 |

The above is prepared as described in Example I.

The above examples are intended for intramuscular injection, but may be administered slowly intravenously if diluted with a suitable vehicle such as normal saline solution, or glucose solution. The latter is necessary since the intravenous administration of the concentration of choline as represented here may result in the sudden flooding of the circulation with choline salts with consequent depression of heart and blood pressure. Intramuscularly no toxic effects are manifested, nor when the solution is given intravenously well diluted.

Clinical trials of such preparations, particularly Example I, have demonstrated a marked acceleration of the clearing of alimentary lipemia following a fatty meal. This effect was apparent in as little as 15 minutes following a single injection of 2 cc.

*Five Typical Cases Illustrating This Effect Are Listed Below*

| Patient | Diagnosis | Percent Clearance after injection | Time after injection |
|---|---|---|---|
| 1 | Normal | 74.6 | 15 min. |
| 2 | Multiple Cerebral Thrombosis | 100 | 15 min. |
| 3 | Cirrhosis of Liver | 70 | 1½ hrs. |
| 4 | Posterior Myocardial Infarction | 34.7 | 1½ hrs. |
| 5 | Anterior Myocardial Infarction | 29 | 15 min. |

According to most investigators the chylomicron concentration or turbidity should be at peak level at the time these samples were taken. The percentages were obtained by calculation using the turbidity at fasting, 3 hours after fat meals, and 15 minutes and 1½ hours after injection, where the turbidity at fasting equal 0 and at 3 hours, 100 percent. In other words, if the turbidity returned to the fasting level, 100 percent clearance was obtained, if it was half-way between the 3 hour and fasting levels, 50 percent clearance was obtained, etc.

From these results it is apparent that the preparation exerts a significant clearing effect on the alimentary lipemia produced by a fatty meal within 15 minutes to 1½ hours after injection in both normal and atherosclerotic patients.

The concentration of giant lipoprotein molecules of the class of Sf 20 to 100 were also significantly reduced following the injection of 2 cc. daily for 7 to 14 days. As examples of this effect, in one case the concentration of these giant molecules was reduced from a pre-medication level of 109 milligrams percent to 37 milligrams percent after 14 injections. In another case the concentration was reduced from 82 milligrams percent to 34 milligrams percent after 7 such injections. No other medication was given, and the diet was unrestricted in both of these cases.

In order to determine the effect of the preparation given in Example I on the coagulation time, 25 patients were given 2 cc. daily for 4 to 5 days totaling 117 injections. The amount of heparin contained in this dosage, would normally prolong the coagulation time markedly.

It was significant that none of these patients exhibited any degree of pain following these injections, whereas heparin injections per se are notable for producing pain.

One hour after the injection of the last dose the coagulation time had increased on the average by only 1 minute, 6 seconds. Three hours after the injection the average coagulation time was only 34 seconds higher than normal. From this it is apparent that the anticoagulant action of heparin was neutralized or markedly reduced in the preparation.

This was further substantiated in laboratory animals. Approximately ½ of this dose (1 cc.) was given to animals weighing averagely only 5 pounds. Despite the massive overdose of heparin, its anticoagulant action was practically nil in this preparation. Similar dosage of heparin alone, however, increased the coagulation time from an average of 3 or 4 minutes to ½ to 3½ hours.

While the invention has been described herein with reference to certain specific embodiments of it, it is understood that numerous modifications, substitutions, or variations may be made therefrom within the scope of the claims. For example, instead of water for injection, other suitable vehicles may be propylene glycol, normal saline, solution of polyvinyl pyrolidine, gelatin solution and similar agents which may accelerate or prolong the action of the therapeutic combination. Various choline derivatives useful as lipotropic agents may be employed in lieu of choline chloride such as choline dihydrogen citrate, choline bitartrate, tricholine citrate, choline iodide, and choline bicarbonate and choline precursors such as methionine, inositol, betaine, and lipocaic. Phospholipids, or other natural materials containing choline or choline precursors may be employed in lieu of choline salts such as lecithin or sphingomyelin.

Usually heparin sodium is the anticoagulant employed, but this may be substituted by other salts of heparin and certain heparin conjugates such as procaine and butacaine conjugates of heparin, choline conjugated heparin, lecithin conjugated heparin, or octylamine heparinate, and other heparin derivatives capable of clearing lipid particles from the blood.

Liver extracts or vitamin $B_{12}$ concentrates or other natural sources of vitamin $B_{12}$ may be used in place of vitamin $B_{12}$ crystalline, U.S.P. Similarly, liver and yeast concentrates and other natural materials rich in folic acid may be used as substitutes of synthetic folic acid.

It will be apparent from the above that I have provided a therapeutically active pharmaceutical composition for parenteral use which is particularly adapted for the prophylaxis and treatment of atherosclerosis and its sequelae, such as angina pectoris, myocardial infarction, arterial nephrosclerosis, and atherosclerosis obliterans, which consists essentially of an anticoagulant, in the form of a heparin derivative, capable of clearing and reducing the lipid particles of the blood, and a non-toxic lipotropic agent in such proportion as to enhance the clearing action of the heparin derivative but which nullify or markedly limit its anticoagulant action, wherein such lipotropic agents comprise phospholipids or phospholipid precursors or both, with or without additional agents, which accelerate or enhance the synthesis or utilization of phospholipids by the body. The prophylaxis and treatment of impaired lipid metabolism with a heparin derivative at a protracted dosage regimen and under which the heparin derivative would provoke toxic manifestations, such as hypocoagulability of the blood, when administered alone, is feasible according to my invention since the heparin derivative is accompanied with the non-toxic phospholipids, phospholipid precursors, or one or more agents which accelerate or enhance the synthesis or utilization of phospholipids by the body and do not interfere with the clearing action of the heparin derivative. My composition is capable of clearing the lipid particles from the blood at a faster rate and to a greater degree than any of the individual ingredients of the composition and the composition has no significant effect on the blood coagulation time.

Various other advantages of my composition will be apparent from the preceding description and the following claims.

Having thus described my invention, what I claim is:

1. A composition for parenteral use consisting essentially of heparin sodium U.S.P. and choline chloride, said composition being capable of clearing the lipid particles from blood at a faster rate and to a greater degree than any of the ingredients of the composition, said composition having no significant effect on the blood coagulation time, and including an agent which accelerates or enhances the synthesis of phospholipids in the body selected from the group consisting of vitamin $B_{12}$ and folic acid.

2. A composition for parenteral use containing heparin sodium, a drug with blood lipid clearing and anticoagulant properties, the clearing action of which is enhanced and the anticoagulant properties of which are limited by accompanying the heparin sodium with choline chloride within the range of from about one to ten times the quantity of heparin sodium, said composition including a substance selected from the group consisting of vitamin $B_{12}$ and folic acid, in therapeutic quantities, to enhance the effect of choline chloride, such quantities being within the range of about 1 microgram to 1000 micrograms per cc. of solution for vitamin $B_{12}$, and about 0.1 mg. to 10 mg. per cc. of solution for folic acid.

References Cited in the file of this patent

Anderson et al.: Proc. Soc. Exper. Biol. and Med., vol. 74 (August 1950), pp. 768–771.

Howe: Proc. Soc. Exper. Biol. and Med., vol. 71 (1949), pp. 429–431.

Jekel: A.M.A. Arch. Derm. and Syphilol., July 1953, pp. 80–82.

Modern Drugs, October 1951, Drug Publications, Inc. New York, p. 737.

Wakerlin: Annals Int'l Med., vol. 37, No. 2, August 1952, pp. 313–322.